(12) United States Patent
Wu et al.

(10) Patent No.: US 6,571,687 B1
(45) Date of Patent: Jun. 3, 2003

(54) ELECTRIC TOASTER

(75) Inventors: Tsan-Kuen Wu, Tainan Hsien (TW); Chi-Ting Chen, Tainan (TW)

(73) Assignee: Tsann Kuen USA Inc., Pasadena, CA (US)

(*) Notice: Subject to any disclaimer, the term of this patent is extended or adjusted under 35 U.S.C. 154(b) by 0 days.

(21) Appl. No.: 10/259,361

(22) Filed: Sep. 27, 2002

(51) Int. Cl.⁷ .............................. A47J 37/08; H05B 1/02
(52) U.S. Cl. .................... 99/327; 99/329 P; 99/329 RT; 99/337; 99/385; 99/389; 99/391; 219/413; 219/492; 219/521
(58) Field of Search ........................... 99/326–333, 337, 99/338, 385, 389–393, 396, 400–402; 219/492, 494, 521, 525, 518, 519, 514, 413, 386, 392, 493, 411; 392/373, 375, 337, 407; 426/241, 243, 466, 523

(56) References Cited

U.S. PATENT DOCUMENTS

| | | | | |
|---|---|---|---|---|
| 1,893,989 A | * | 1/1933 | Galer | 99/390 X |
| 1,926,276 A | * | 9/1933 | Forbes | 99/332 |
| 1,967,209 A | * | 7/1934 | Lawrence | 99/327 |
| 1,979,845 A | * | 11/1934 | Schallis | 99/332 |
| 2,631,523 A | * | 3/1953 | Olving | 99/331 X |
| 3,956,978 A | * | 5/1976 | Borley | 99/329 R |
| 4,345,513 A | * | 8/1982 | Holt | 99/401 X |
| 5,018,437 A | * | 5/1991 | San Juan | 99/327 |
| 5,044,263 A | * | 9/1991 | Birkert et al. | 99/327 |
| 5,304,782 A | * | 4/1994 | McNair et al. | 219/497 X |
| 5,771,780 A | * | 6/1998 | Basora et al. | 99/389 X |
| 5,802,957 A | * | 9/1998 | Wanat et al. | 219/521 X |
| 6,014,925 A | * | 1/2000 | Basora et al. | 99/327 |

\* cited by examiner

*Primary Examiner*—Timothy F. Simone
(74) *Attorney, Agent, or Firm*—Ladas & Parry

(57) ABSTRACT

An electric toaster includes a power switch unit driven by an electromagnet, for holding a spring-loaded carriage mounted in a toasting compartment when the carriage is moved from an upper position to a lower position, so as to switch from an OFF-mode, where the electromagnet is disposed in a deactivated position, to an ON-mode, where the electromagnet is disposed in an activated position. A control unit enables the electromagnet to be excited when the carriage is moved from the upper position to the lower position so as to attract the carriage such that the electromagnet subsequently moves with the carriage from the deactivated position to the activated position.

4 Claims, 7 Drawing Sheets

ELECTRIC TOASTER

BACKGROUND OF THE INVENTION

1. Field of the Invention

The invention relates to an electric toaster, more particularly to an electric toaster that can enhance safety.

2. Description of the Related Art

FIG. 1 illustrates a conventional electric toaster that includes a housing 10 having a toasting compartment 11, and a carriage 12. The toasting compartment 11 is provided with two slots 111 at its top for receiving bread 13 to be toasted. An electric heating unit (not shown) is disposed in the toasting compartment 11.

The carriage 12 is operable so as to move between an upper position and a lower position indicated by the dotted lines in FIG. 1. When the carriage 12 is disposed in the upper position, the electric heating unit is deactivated. When the carriage 12 is moved to the lower position, the electric heating unit is activated so as to toast the bread 13 loaded in the carriage 12.

In a normal state, the carriage 12 can be moved automatically from the lower position to the upper position in a known manner after a predetermined toasting cycle. Generally, an excited electromagnet is used to attract the carriage 12 during a toasting cycle. It is noted that an over-heating problem cannot be prevented when the carriage 12 is jammed at the lower position for some reason. In order to overcome the aforesaid problem, a relay can be used to control the supply electric power to the electric heating unit. Such a solution, however, results in a relatively high cost.

SUMMARY OF THE INVENTION

Therefore, the object of the present invention is to provide an electric toaster that can effectively control deactivation of an electric heating unit even when jamming of a carriage occurs.

According to the present invention, an electric toaster comprises:

a housing including a toasting compartment;

an electric heating unit disposed in the toasting compartment;

a spring-loaded carriage mounted in the toasting compartment and movable vertically between a lower position and an upper position, whereby a food item to be toasted is adapted to be loaded in and unloaded from the carriage when the carriage is in the upper position and whereby the food item is adapted to be toasted when the carriage is in the lower position;

an electromagnet disposed in the housing adjacent to the carriage when the carriage is moved to the lower position for holding the carriage in the lower position, the electromagnet being movable between a deactivated position and an activated position;

a power switch unit disposed in the housing and connected electrically to the electric heating unit, the power switch unit being driven by the electromagnet so as to switch from an OFF-mode, where the electromagnet is disposed in the deactivated position, to an ON-mode, where the electromagnet is disposed in the activated position; and a control unit connected electrically to the electromagnet and the power switch unit, the control unit enabling the electromagnet to be excited when the carriage is moved from the upper position to the lower position so as to attract the carriage such that the electromagnet subsequently moves with the carriage from the deactivated position to the activated position, the control unit enabling activation of the electric heating unit to toast the food item in the carriage when the electromagnet is disposed in the activated position and drives the power switch unit to switch to the ON-mode.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
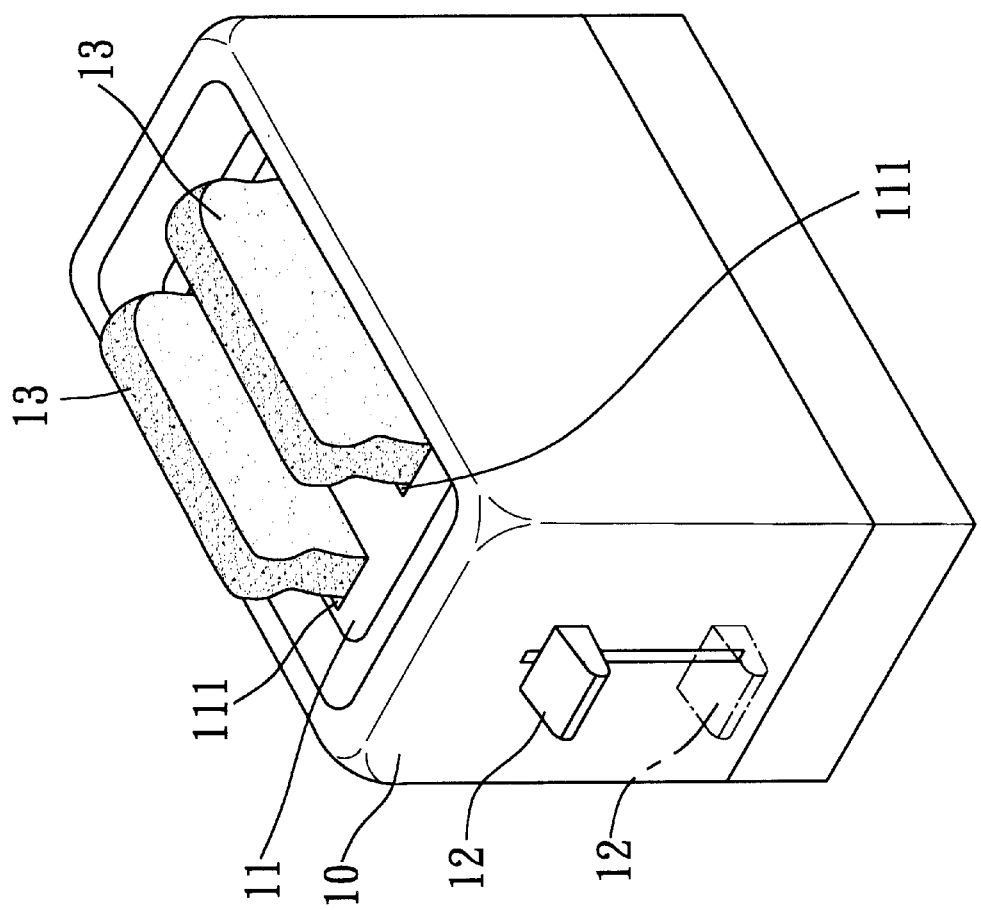
FIG. 1 is a perspective view showing a conventional electric toaster.
Figure 2:
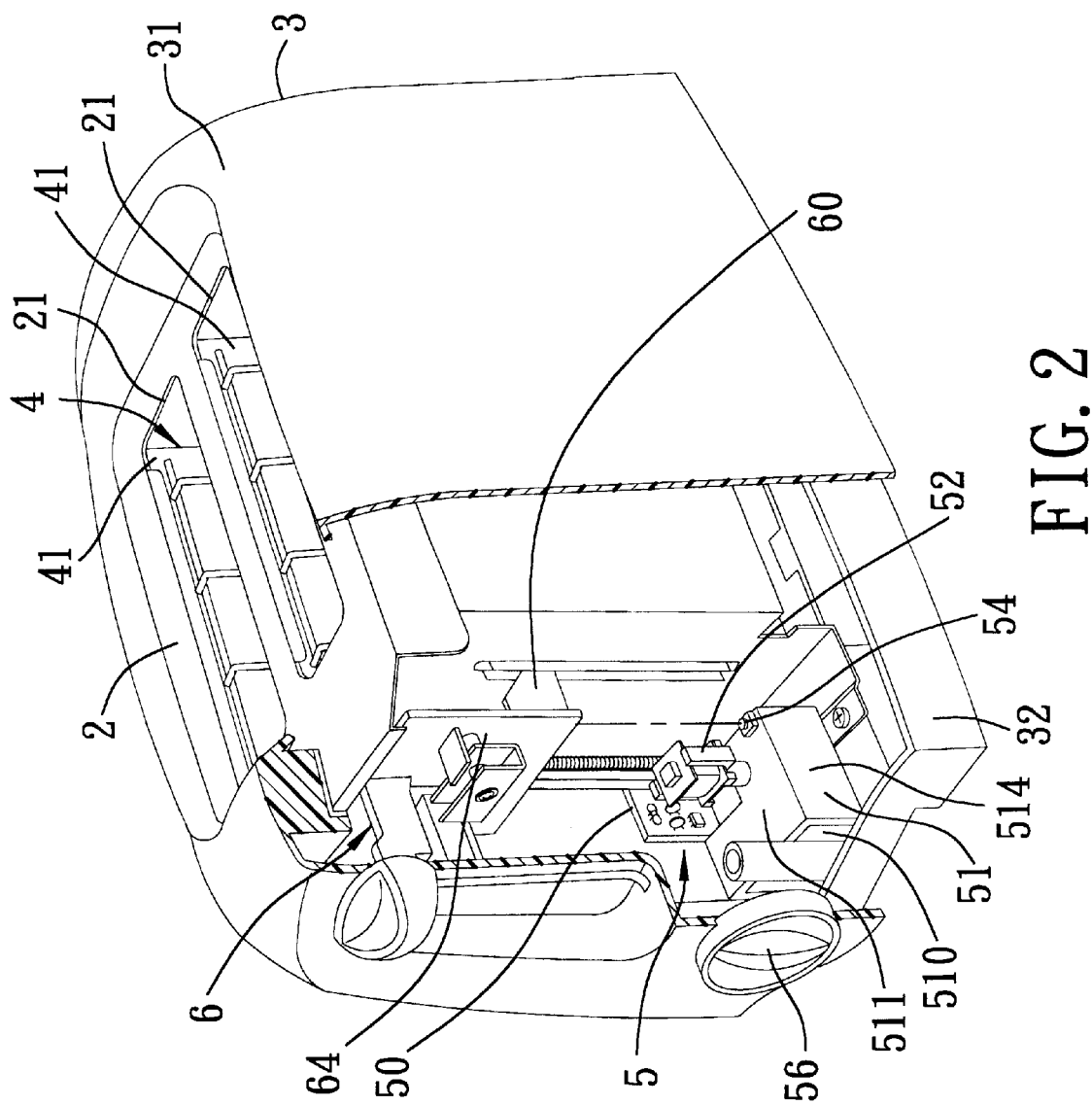
FIG. 2 is a perspective, partly cutaway view showing the preferred embodiment of an electric toaster according to the present invention.
Figure 3:
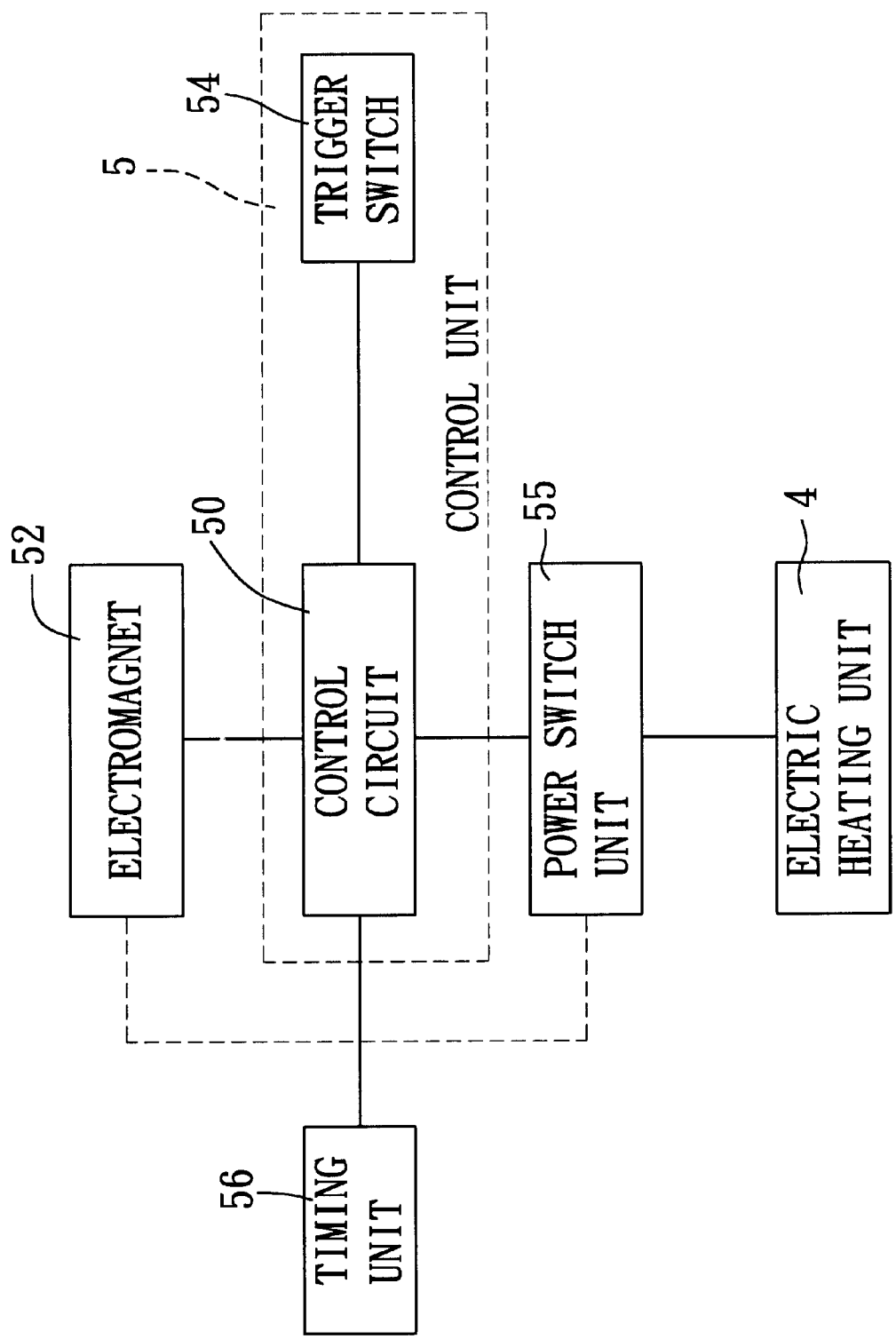
FIG. 3 is a schematic circuit block diagram illustrating the preferred embodiment.
Figure 4:
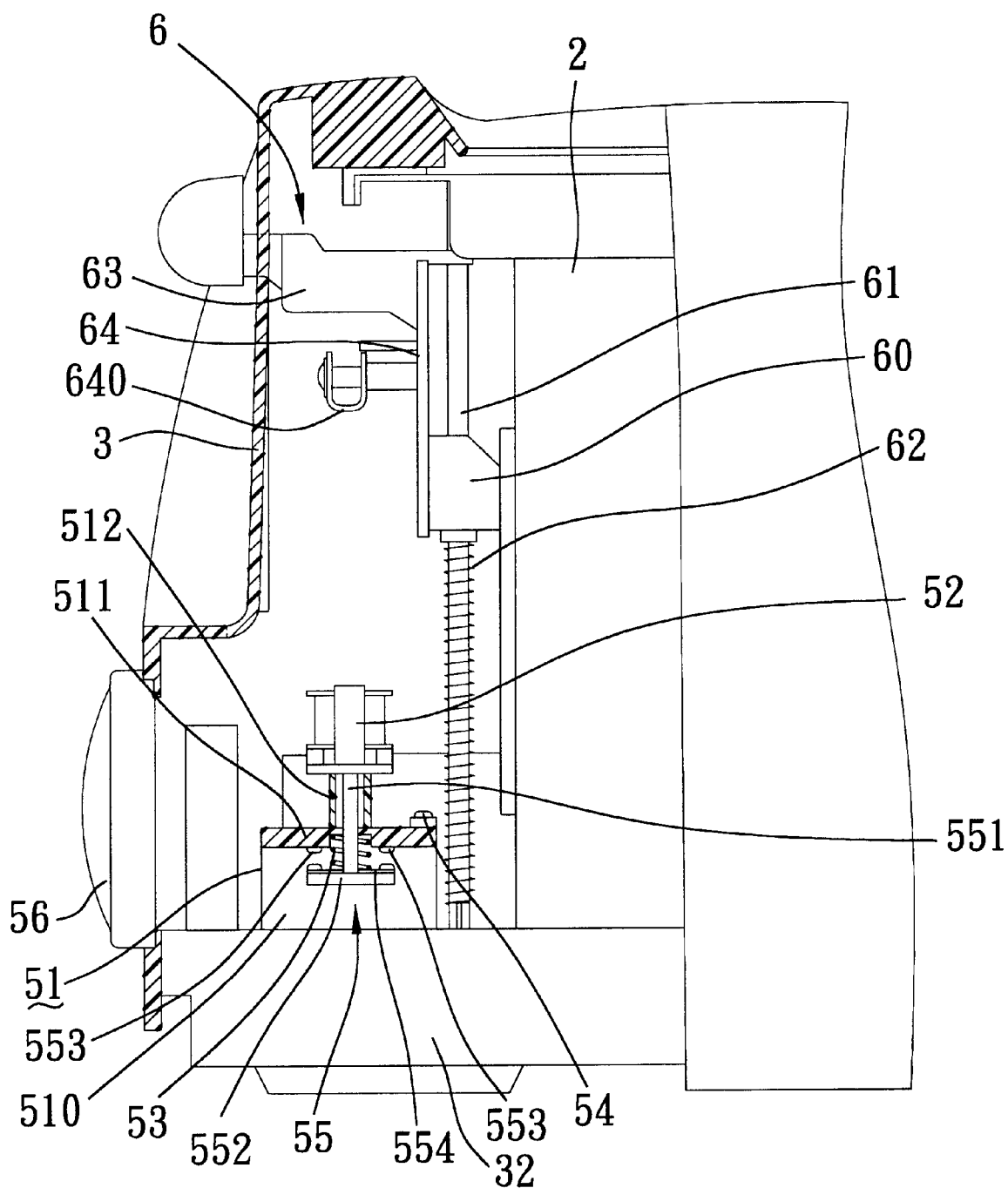
FIG. 4 is a fragmentary partly sectional schematic view showing the preferred embodiment when a spring-loaded carriage is disposed in an upper position and when an electromagnet is disposed in a deactivated position.

Referring to FIGS. 2 to 4, the preferred embodiment of an electric toaster according to the present invention is shown to include a housing 3, an electric heating unit 4, a spring-loaded carriage 6, an electromagnet 52, a power switch unit 55, and a control unit 5.

The housing 3, which is made of a heat-resistant plastic material, has a base 32 and a surrounding wall 31 defining a toasting compartment 2 that is provided with two slots 21 at its top for receiving a food item (not shown) for toasting.

The electric heating unit 4 is disposed in the toasting compartment 2 for supplying heat energy required for toasting the food item. In this embodiment, the electric heating unit 4 includes a plurality of electric heating plates 41.

The carriage 6 is mounted in the toasting compartment 2 and is movable vertically between a lower position and an upper position, whereby the food item to be toasted is adapted to be loaded in and unloaded from the carriage 6 when the carriage 6 is in the upper position, and whereby the food item is adapted to be toasted when the carriage 6 is in the lower position. In this embodiment, the carriage 6 has a supporting portion 60 extending horizontally into the toasting compartment 2, an operating portion 63 extending outwardly of the housing 3, and an interconnecting portion 64 interconnecting the supporting portion 60 and the operating portion 63 and mounted movably on a guiding post 61 that is sleeved with a biasing spring 62 disposed between the interconnecting portion 64 and the base 32.

The electromagnet 52 is disposed in the housing 3 adjacent to the interconnecting portion 64 of the carriage 6 when the carriage 52 is moved to the lower position for holding the carriage 52 in the lower position. The electromagnet 52 is movable between a deactivated position and an activated position.

Figure 6:
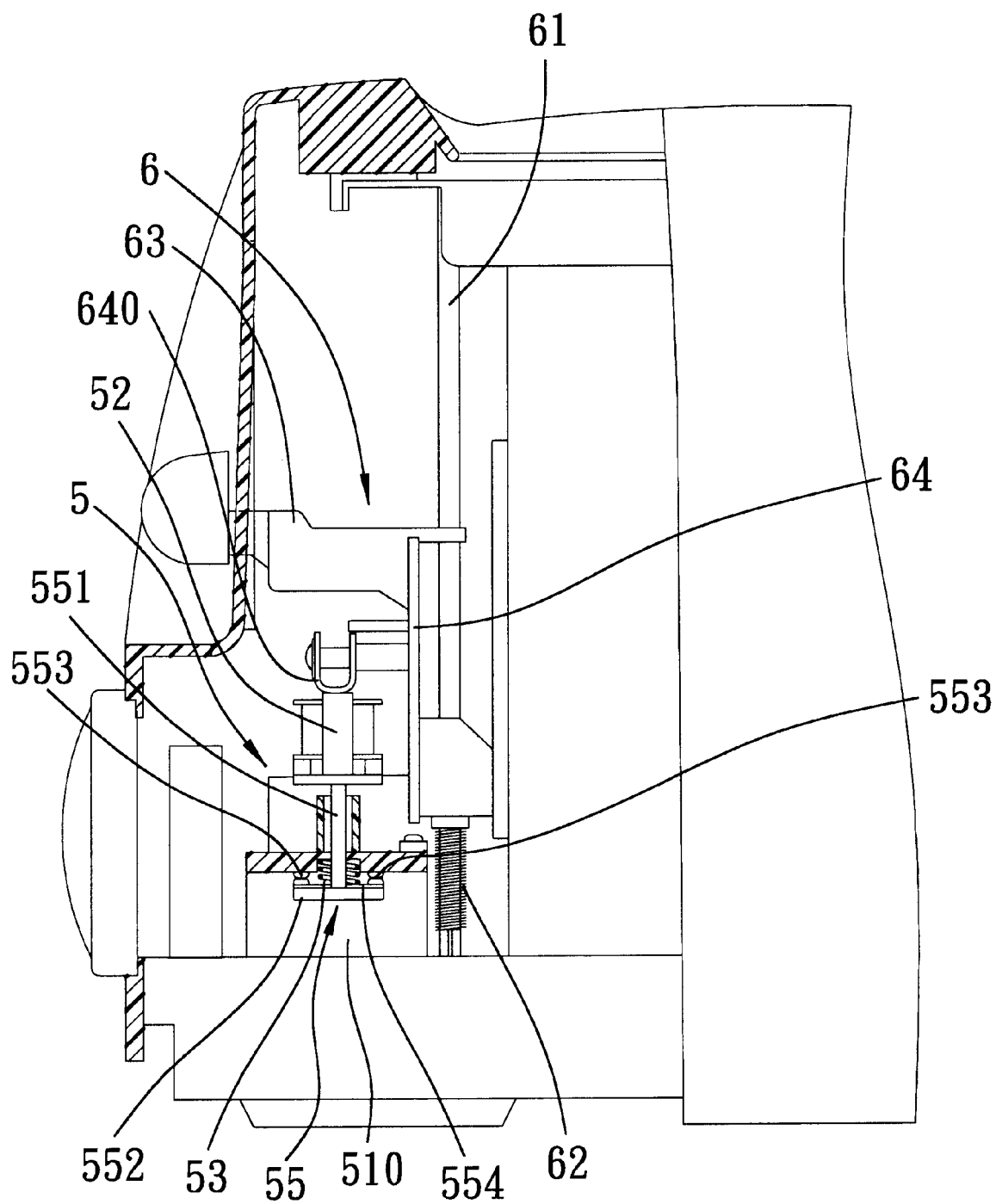
FIG. 6 is a fragmentary partly sectional schematic view showing the preferred embodiment when the electromagnet is disposed in an activated position and when the power switch unit is in an ON-mode.
Figure 7:
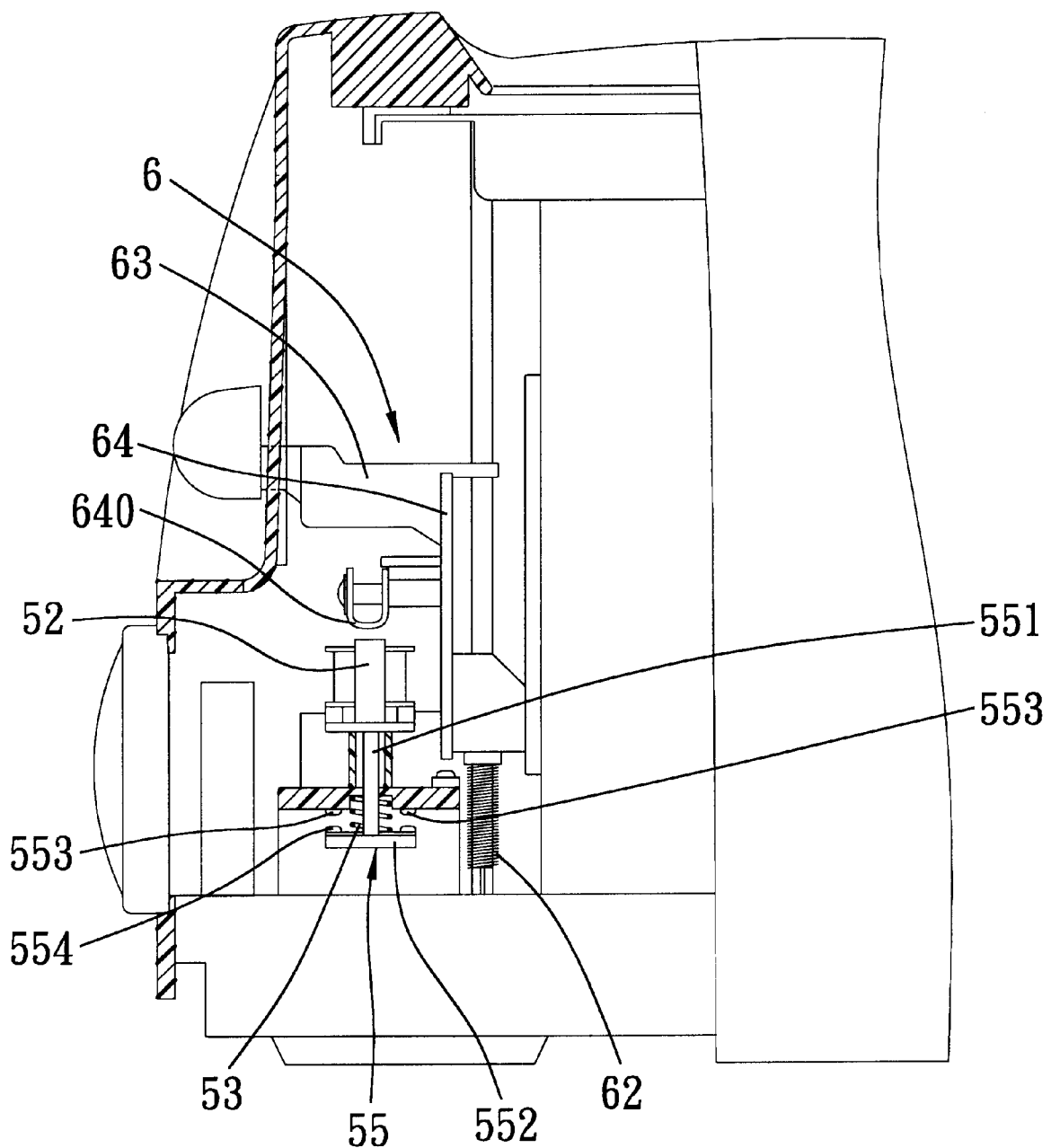
FIG. 7 is a fragmentary partly sectional schematic view of the preferred embodiment to illustrate how the electromagnet is moved from the activated position to the deactivated position when the carriage is jammed.

The power switch unit 55 is disposed in the housing 3 and is connected electrically to the electric heating unit 4. The power switch unit 55 is driven by the electromagnet 52 so as to switch from an OFF-mode, where the electromagnet 52 is disposed in the deactivated position, to an ON-mode, where the electromagnet 52 is disposed in the activated position. In this embodiment, the power switch unit 55 includes a mounting seat 51, a stationary contact member, a movable contact member 552, and a biasing piece 53. The mounting seat 51 is mounted fixedly on the base 32, and has a top plate 511 and opposite side plates 514 that confine an inner space 510. The stationary contact member, which consists of a plurality of electrical contacts 553, is disposed in the inner space 510 and is mounted fixedly on the top plate 511. The movable contact member 552 is disposed movably on the inner space 510, and is connected to the electromagnet 52 via a connecting post 551 that extends through the top plate 511 and a hollow stop post 512 provided on the top plate 511 of the mounting seat 51. The movable contact member 552 is formed with a plurality of electrical contacts 554 corresponding to the electrical contacts 553. The movable contact member 552 contacts electrically the stationary contact member when the electromagnet 52 is disposed in the activated position such that the power switch unit 55 is switched to the ON-mode, as shown in FIG. 6, and is spaced apart from the stationary contact member when the electromagnet 52 is disposed in the deactivated position such that the power switch unit 55 is switched to the OFF-mode, as shown in FIG. 4. In the embodiment, the biasing piece 53 is a coiled spring that is sleeved on the connecting post 551 and that is disposed in the inner space 510 between the top plate 511 and the movable contact member 552 for biasing the movable contact member 552 such that the power switch unit 55 is normally in the OFF-mode, as shown in FIG. 7, even when jamming of the carriage 6 in the lower position has occurred.

Figure 5:
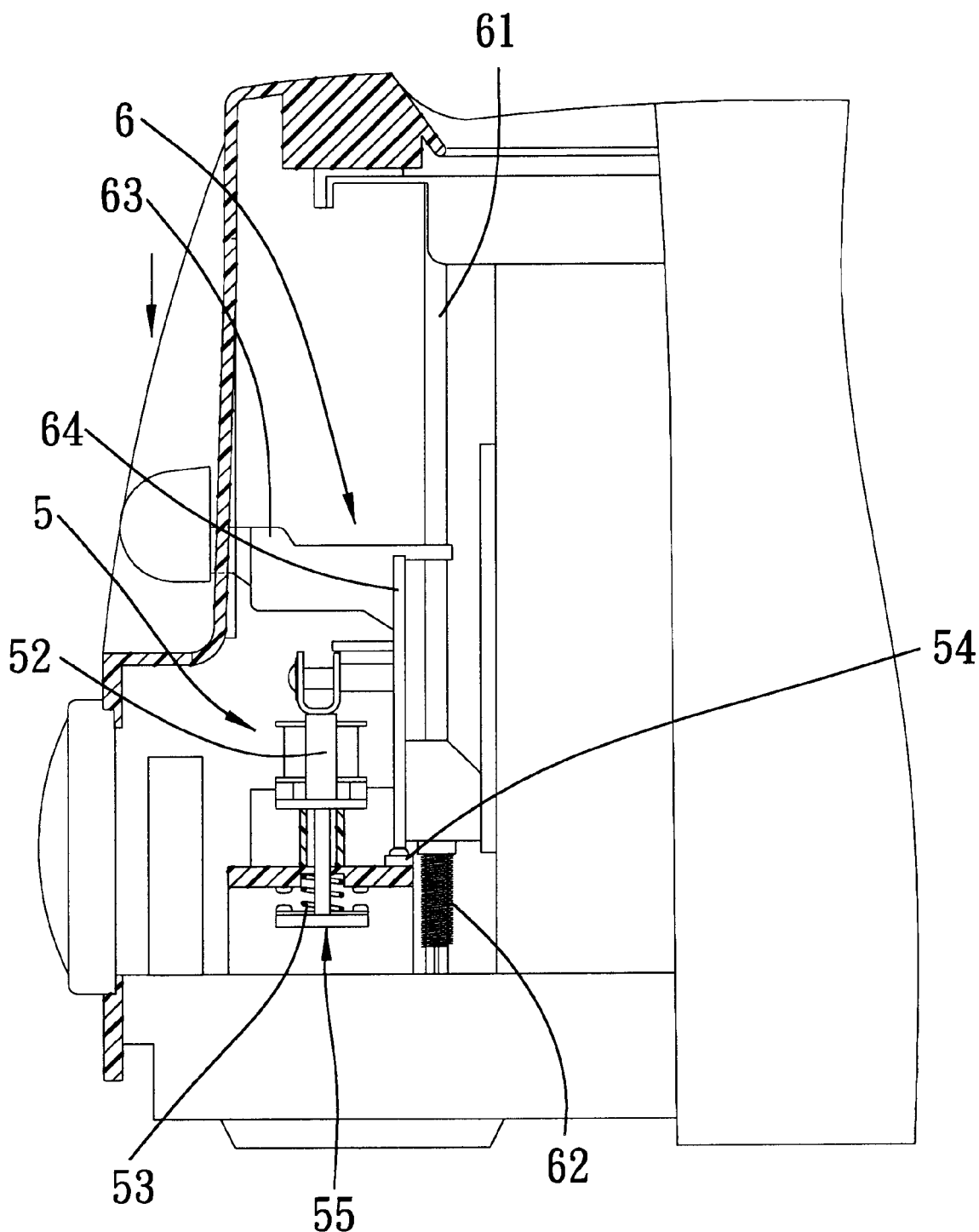
FIG. 5 is a fragmentary partly sectional schematic view showing the preferred embodiment when the electromagnet is excited and when a power switch unit is in an OFF-mode.

The control unit 5 is connected electrically to the electromagnet 52 and the power switch unit 55. The control unit 5 enables the electromagnet 52 to be excited when the carriage 6 is moved from the upper position to the lower position so as to attract a U-shaped metal block 640 provided on the interconnecting portion 64 of the carriage 6 such that the electromagnet 52 subsequently moves with the carriage 6 from the deactivated position to the activated position due to biasing action of the biasing spring 62. The control unit 5 enables activation of the electric heating unit 4 to toast the food item in the carriage 6 when the electromagnet 52 is disposed in the activated position and drives the power switch unit 55 to switch to the ON-mode. In this embodiment, the control unit 5 includes a control circuit 50 implemented on a circuit board and connected electrically to the electromagnet 52 and the power switch unit 55, and a trigger switch 54 disposed on the top plate 511 of the mounting seat 51 and connected electrically to the control circuit 50 for controlling excitation of the electromagnet 52. The trigger switch 54 is triggered by the interconnecting portion 64 of the carriage 6 when the carriage 6 is moved form the upper position to the lower position so as to generate a trigger signal to the control circuit 50 to excite the electromagnet 52, as shown in FIG. 5.

The electric toaster further includes a timing unit 56 disposed on the housing 3 and connected electrically to the control circuit 50 of the control unit 5. The timing unit 56 is operable so as to generate a timing signal to the control circuit 50 such that the control circuit 50 controls supply of electric power to the electromagnet 52 according to the timing signal.

In view of the foregoing, the electric toaster of this invention operates in the following stages:

1. When the electric toaster is not in use, as shown FIGS. 2 and 4, the carriage 6 is disposed in the upper position, the electromagnet 52 is disposed in the deactivated position, and the power switch unit 55 is in the OFF-mode. Accordingly, the electric heating unit 4 is deactivated.

2. When a food item loaded into the carriage 6 is to be toasted, the carriage 6 is moved from the upper position to the lower position due to application of an external force indicated by an arrow in FIG. 5 such that the electromagnet 52 is excited after the trigger switch 54 is triggered by the carriage 6 so as to attract the carriage 6.

3. Subsequently, when the operation portion 63 is relieved from the external force, the electromagnet 52 moves with the carriage 6 from the deactivated position to the activated position due to the biasing of the biasing spring 62 such that the power switch unit 55 is switched from the OFF-mode to the ON-mode, as shown in FIG. 6. As such, the electric heating unit 4 is activated by the control unit 5 at this time so as to toast the food item in the carriage 6.

4. After a predetermined toasting cycle controlled by the timing unit 56, the electromagnet 52 ceases to be excited such that the carriage 6 is biased to move from the lower position to the upper position. However, if the carriage 6 is jammed in the lower position for some reason, the biasing piece 53 biases the movable contact member 522 such that the power switch unit 55, can be switched normally to the OFF-mode, as best shown in FIG. 7. Therefore, safety can be ensured.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electric toaster comprising:

a housing including a toasting compartment;

an electric heating unit disposed in said toasting compartment;

a spring-loaded carriage mounted in said toasting compartment and movable vertically between a lower position and an upper position, whereby a food item to be toasted is adapted to be loaded in and unloaded from said carriage when said carriage is in the upper position and whereby the food item is adapted to be toasted when said carriage is in the lower position;

an electromagnet disposed in said housing adjacent to said carriage when said carriage is moved to the lower position for holding said carriage in the lower position, said electromagnet being movable between a deactivated position and an activated position;

a power switch unit-disposed in said housing and connected electrically to said electric heating unit, said power switch unit being driven by said electromagnet so as to switch from an OFF-mode, where said, electromagnet is disposed in the deactivated position, to an ON-mode, where said electromagnet is disposed in the activated position; and a control unit connected electrically to said electromagnet and said power switch unit, said control unit enabling said electromagnet to be excited when said carriage is moved from the upper position to the lower position so as to attract said carriage such that said electromagnet subsequently moves with said carriage from the deactivated position to the activated position, said control unit enabling activation of said electric heating unit to toast the food item in said carriage when said electromagnet is disposed in the activated position and drives said power switch unit to switch to the ON-mode.

2. The electric toaster as claimed in claim 1, further comprising a timing unit disposed on said housing and connected to said control unit, said timing unit being operable so as to generate a timing signal to said control unit such that said control unit controls supply of electric power to said electromagnet according to the timing signal.

3. The electric toaster as claimed in claim 1, wherein said power switch unit includes a mounting seat having a top plate and opposite side plates that confine an inner space, a stationary contact member disposed in said inner space and mounted fixedly on said top plate, a movable contact member disposed movably in said inner space and connected to said electromagnet, said movable contact member contacting electrically said stationary contact member when said electromagnet is disposed in the activated position such that said power switch unit is switched to the ON-mode, and being spaced apart from said stationary contact member when said electromagnet is disposed in the deactivated position such that said power switch unit is switched to the OFF-mode, and a biasing piece disposed in said inner space between said top plate and said movable contact member for biasing said movable contact member such that said power switch unit is normally in the OFF-mode.

4. The electric toaster as claimed in claim 3, wherein said control unit includes a control circuit connected electrically to said electromagnet and said power switch unit, and a trigger switch disposed on said top plate of said mounting seat and connected electrically to said control circuit for controlling excitation of said electromagnet, said trigger switch being triggered by said carriage when said carriage is moved from the upper position to the lower position so as to generate a trigger signal to said control circuit for enabling said control circuit to excite said electromagnet.

* * * * *